US011342549B2

(12) United States Patent
Chen et al.

(10) Patent No.: US 11,342,549 B2
(45) Date of Patent: May 24, 2022

(54) METHOD FOR FORMING SULFUR-CONTAINING ELECTRODE USING SALT ADDITIVE

(71) Applicant: GM GLOBAL TECHNOLOGY OPERATIONS LLC, Detroit, MI (US)

(72) Inventors: Shuru Chen, Troy, MI (US); Fang Dai, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 170 days.

(21) Appl. No.: 16/743,650

(22) Filed: Jan. 15, 2020

(65) Prior Publication Data

US 2021/0218015 A1 Jul. 15, 2021

(51) Int. Cl.
| | |
|---|---|
| *H01M 4/04* | (2006.01) |
| *H01M 4/139* | (2010.01) |
| *H01M 10/0525* | (2010.01) |
| *H01M 4/38* | (2006.01) |
| *H01M 4/62* | (2006.01) |
| *H01M 4/02* | (2006.01) |

(52) U.S. Cl.
CPC ......... *H01M 4/139* (2013.01); *H01M 4/0404* (2013.01); *H01M 4/0435* (2013.01); *H01M 4/38* (2013.01); *H01M 4/62* (2013.01); *H01M 10/0525* (2013.01); *H01M 2004/021* (2013.01)

(58) Field of Classification Search
CPC .................................................. H01M 4/0435
See application file for complete search history.

(56) References Cited

U.S. PATENT DOCUMENTS

| | | | |
|---|---|---|---|
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |

(Continued)

FOREIGN PATENT DOCUMENTS

| | | |
|---|---|---|
| CN | 113130850 A | 7/2021 |
| DE | 102020133444 A1 | 7/2021 |
| WO | 2017045573 A1 | 3/2017 |

*Primary Examiner* — Austin Murata
(74) *Attorney, Agent, or Firm* — Harness, Dickey & Pierce, P.L.C.

(57) ABSTRACT

The present disclosure relates to sulfur-containing electrodes and methods for forming the same. For example, the method may include disposing an electroactive material on or near a current collector to form an electroactive material layer having a first porosity and applying pressure and heat to the electroactive material layer so that the electroactive material layer has a second porosity. The first porosity is greater than the second porosity. The electroactive material may include a plurality of electroactive material particles and one or more salt additives. The method may further include contacting the electroactive material layer and an electrolyte such that the electrolyte dissolves the plurality of one or more salt particles so that the electroactive material layer has a third porosity. The third porosity may be greater than the second porosity and less than the first porosity.

17 Claims, 4 Drawing Sheets

(56) References Cited

U.S. PATENT DOCUMENTS

| | | |
|---|---|---|
| 9,437,871 B2 | 9/2016 | Zhou et al. |
| 9,537,144 B2 | 1/2017 | Huang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,396,360 B2 | 8/2019 | Xiao et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0104713 A1* | 4/2015 | Gaben ................ H01M 4/0457 429/231.95 |
| 2015/0349307 A1 | 12/2015 | Dadheech et al. |
| 2015/0349380 A1* | 12/2015 | Manthiram ........... H01M 4/366 429/340 |
| 2016/0111721 A1 | 4/2016 | Xiao et al. |
| 2016/0172706 A1 | 6/2016 | Xiao et al. |
| 2016/0172710 A1 | 6/2016 | Liu et al. |
| 2017/0162859 A1 | 6/2017 | Yang et al. |
| 2017/0214079 A1 | 7/2017 | Dai et al. |
| 2017/0271678 A1 | 9/2017 | Yang et al. |
| 2018/0114976 A1* | 4/2018 | Lee ................... H01M 10/0525 |
| 2019/0115619 A1* | 4/2019 | Yamamoto ........ H01M 10/0525 |
| 2020/0373555 A1* | 11/2020 | Yushin .................. H01M 4/587 |
| 2021/0028436 A1* | 1/2021 | Tanaka ............. H01M 10/0525 |

* cited by examiner

METHOD FOR FORMING SULFUR-CONTAINING ELECTRODE USING SALT ADDITIVE

GOVERNMENT SUPPORT

This invention was made with government support under DE-EE0008230 awarded by the Department of Energy. The Government has certain rights in the invention.

INTRODUCTION

This section provides background information related to the present disclosure which is not necessarily prior art.

The present disclosure relates to electrodes, for example sulfur-containing electrodes, for use in lithium-ion electrochemical cells and methods of forming the same. The method may include disposing an electroactive material including a plurality of salt additive particles on or near one or more surfaces of a current collector to form an electroactive material layer having a first porosity and applying pressure to the electroactive material layer so that the electroactive material layer has a second porosity, where the first porosity is greater than the second porosity.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium-ion and lithium-sulfur batteries include at least two electrodes and an electrolyte and/or separator. One of the two electrodes serves as a positive electrode or cathode and the other electrode serves as a negative electrode or anode. Each of the electrodes is connected to a current collector (typically a metal, such as copper for the anode and aluminum for the cathode). A separator and/or electrolyte may be disposed between the negative and positive electrodes. The electrolyte is suitable for conducting lithium ions between the electrodes and, like the two electrodes, may be in various instances solid and/or liquid form and/or a hybrid thereof. In instances of solid-state batteries, which include solid-state electrodes and a solid-state electrolyte, the solid-state electrolyte may physically separate the electrodes so that a distinct separator is not required.

Lithium-sulfur batteries may include cathodes having sulfur-based electroactive materials, for example, elemental sulfur (S) and/or $Li_2S_x$ where $1 \leq x \leq 8$. Such cathodes often include one or more electroactive material layers, including for example a plurality of electroactive material particles, disposed on or near one or more surfaces of a current collector. Common fabrication methods include disposing a plurality of electroactive material particles near the one or more surfaces of the current collector to form an electroactive material layer and applying pressure to the plurality of electroactive material particles (i.e., the precursor electroactive material layer) to form a calendared or consolidated electroactive material layer, for example by using a calendaring process. After the consolidation process, like calendaring, the calendared or consolidated electroactive material layer has a porosity different from the initial porosity. The fabrication method typically includes then introducing an electrolyte into the calendared or consolidated electroactive material layer to form the cathode. However, such cathodes that have been exposed to calendaring or other consolidation processes often experience low capacity utilization (e.g., less than 50%) as a result of low electrolyte penetration into the calendared or consolidated electroactive material layer, which often has a porosity of less than or equal to about 50%. Accordingly, it would be desirable to develop improved cathodes, and methods of making the same, for an electrochemical cell that can address these challenges, and preferably, methods and materials that may be readily integrated into common manufacturing processes.

SUMMARY

This section provides a general summary of the disclosure, and is not a comprehensive disclosure of its full scope or all of its features.

In various aspects, the present disclosure provides a method of preparing an electrode for use in an electrochemical cell that cycles lithium ions. The method includes disposing an electroactive material admixture on or near one or more surfaces of a current collector to form an electroactive material layer having a first porosity. The electroactive material admixture may include a plurality of electroactive material particles and a plurality of salt additive particles. The method may further include applying pressure to the electroactive material layer so that the second electroactive material layer has a second porosity. The first porosity may be greater than the second porosity. The second electroactive material layer and the current collector may define the electrode.

In one aspect, the plurality of salt additive particles may be selected from the group consisting of: lithium hexafluorophosphate ($LiPF_6$), lithium hexafluoroarsenate ($LiAsF_6$), lithium fluorosulfonylimide ($LiN(FSO_2)_2$) (LiFSI), lithium bis(trifluoromethanesulfonimide) ($LiN(CF_3SO_2)_2$), lithium triflate ($LiCF_3SO_3$), lithium perchlorate ($LiClO_4$), lithium tetrafluoroborate ($LiBF_4$), lithium nitrate ($LiNO_3$), lithium iodide (LiI), lithium bromide (LiBr), lithium bis(trifluoromethanesulfonimide) (LiTFSI) ($LiN(CF_3SO_2)_2$), and combinations thereof.

In one aspect, the electroactive material admixture may include greater than or equal to about 70 wt. % to less than or equal to about 90 wt. % of the plurality of electroactive material particles and greater than or equal to about 10 wt. % to less than or equal to about 30 wt. % of the plurality of salt additive particles.

In one aspect, the first porosity may be greater than or equal to about 60 vol. % to less than or equal to about 80 vol. % of the electroactive material layer, and the second porosity may be greater than or equal to about 30 vol. % to less than or equal to about 65 vol. % of the electroactive material layer.

In one aspect, the method may further include contacting the electroactive material layer with an electrolyte such that the electrolyte dissolves the plurality of salt additive particles so that the electroactive material layer has a third porosity. The third porosity may be greater than the second porosity and less than the first porosity.

In one aspect, the third porosity may be greater than or equal to about 40 vol. % to less than or equal to about 70 vol. % of the electroactive material layer.

In one aspect, the electrolyte may include one or more lithium salts that dissolve in one or more solvents selected from 1,2-dimethoxyethane (DME), 1-2-diethoxyethane, ethoxymethoxyethane, tetrahydrofuran, 2-methyltetrahydrofuran, 1,3-dioxolane (DOL), and sulfolane.

In one aspect, applying pressure may further include applying heat to the electroactive material layer.

In one aspect, the electroactive material layer may be heated to greater than or equal to about 40° C. to less than or equal to about 100° C.

In one aspect, the each electroactive material particle of the plurality of electroactive material particles may include one or more of S, $S_8$, $Li_2S_8$, $Li_2S_6$, $Li_2S_4$, $Li_2S_2$, and $Li_2S$.

In various aspects, the present disclosure provides a method of preparing a sulfur-containing electrode for use in an electrochemical cell that cycles lithium ions. The method may include disposing a slurry comprising a plurality of sulfur-based electroactive material particles and plurality of salt particles on or near one or more surfaces of a current collector to form an electroactive material layer having a first porosity. The method may further include calendaring the electroactive material layer so that the electroactive material layer has a second porosity. The first porosity may be greater than the second porosity. The electroactive material layer and the current collector may define the sulfur-containing electrode.

In one aspect, the plurality of salt particles may be selected from the group consisting of: lithium hexafluorophosphate ($LiPF_6$), lithium hexafluoroarsenate ($LiAsF_6$), lithium fluorosulfonylimide ($LiN(FSO_2)_2$) (LiFSI), lithium bis(trifluoromethanesulfonimide) ($LiN(CF_3SO_2)_2$), lithium triflate ($LiCF_3SO_3$), lithium perchlorate ($LiClO_4$), lithium tetrafluoroborate ($LiBF_4$), lithium nitrate ($LiNO_3$), lithium iodide (LiI), lithium bromide (LiBr), lithium bis(trifluoromethanesulfonimide) (LiTFSI) ($LiN(CF_3SO_2)_2$), and combinations thereof.

In one aspect, the electroactive material may include greater than or equal to about 70 wt. % to less than or equal to about 90 wt. % of the plurality of sulfur-based electroactive material particles and greater than or equal to about 10 wt. % to less than or equal to about 30 wt. % of the plurality of salt particles.

In one aspect, the first porosity may be greater than or equal to about 60 vol. % to less than or equal to about 80 vol. % of the electroactive material layer, and the second porosity may be greater than or equal to about 30 vol. % to less than or equal to about 65 vol. % of the electroactive material layer.

In one aspect, the method may include contacting the electroactive material layer and an electrolyte such that the electrolyte dissolves the plurality of salt particles so that the electroactive material layer has a third porosity. The third porosity may be greater than the second porosity and less than the first porosity.

In one aspect, the third porosity may be greater than or equal to about 40 vol. % to less than or equal to about 70 vol. % of the electroactive material layer.

In one aspect, the electrolyte may include one or more lithium salts that dissolve in one or more solvents selected from 1,2-dimethoxyethane (DME), 1-2-diethoxyethane, ethoxymethoxyethane, tetrahydrofuran, 2-methyltetrahydrofuran, 1,3-dioxolane (DOL), and sulfolane.

In one aspect, calendaring may include applying a pressure to and heating the electroactive material layer.

In one aspect, the electroactive material layer may be heated to a temperature greater than or equal to about 40° C. to less than or equal to about 100° C.

In one aspect, the method may further include, prior to calendaring the electroactive material layer, drying the slurry so as to remove a carrier containing the plurality of sulfur-based electroactive material particles and the plurality of salt particles.

In various aspects, the present disclosure provides a method of preparing a sulfur-containing electrode for use in an electrochemical cell that cycles lithium ions. The method may include disposing an electroactive material admixture on or near one or more surfaces of a current collector to form an electroactive material layer having a first porosity and calendaring the electroactive material layer, so that the electroactive material layer has a second porosity. The first porosity may be greater than the second porosity. The electroactive material admixture may include a plurality of electroactive material particles and a plurality of salt additive particles. The electroactive material layer and the current collector may define the sulfur-containing cathode, which is configured to receive the electrolyte. When the electrolyte is received, the electrolyte may dissolve the plurality of salt particles so that the electroactive material layer has a third porosity. The third porosity may be greater than the second porosity and less than the first porosity.

In one aspect, the first porosity may be greater than or equal to about 60 vol. % to less than or equal to about 80 vol. % of the electroactive material layer; the second porosity may be greater than or equal to about 30 vol. % to less than or equal to about 65 vol. % of the electroactive material layer; and the third porosity may be greater than or equal to about 40 vol. % to less than or equal to about 70 vol. % of the electroactive material layer.

In one aspect, the electroactive material admixture may include greater than or equal to about 70 wt. % to less than or equal to about 90 wt. % of the plurality of electroactive material particles and greater than or equal to about 10 wt. % to less than or equal to about 30 wt. % of the plurality of salt additive particles.

In one aspect, the plurality of salt particles may be selected from the group consisting of: lithium hexafluorophosphate ($LiPF_6$), lithium hexafluoroarsenate ($LiAsF_6$), lithium fluorosulfonylimide ($LiN(FSO_2)_2$) (LiFSI), lithium bis(trifluoromethanesulfonimide) ($LiN(CF_3SO_2)_2$), lithium triflate ($LiCF_3SO_3$), lithium perchlorate ($LiClO_4$), lithium tetrafluoroborate ($LiBF_4$), lithium nitrate ($LiNO_3$), lithium iodide (LiI), lithium bromide (LiBr), lithium bis(trifluoromethanesulfonimide) (LiTFSI) ($LiN(CF_3SO_2)_2$), and combinations thereof.

In one aspect, the electrolyte may include one or more lithium salts that dissolve in one or more solvents selected from 1,2-dimethoxyethane (DME), 1-2-diethoxyethane, ethoxymethoxyethane, tetrahydrofuran, 2-methyltetrahydrofuran, 1,3-dioxolane (DOL), and sulfolane.

In various aspects, the present disclosure provides a sulfur-containing electrode. The sulfur-containing electrode may include a current collector and a sulfur-based electroactive material layer disposed on or near one or more surfaces of the current collector. The electroactive material layer may have a porosity greater than or equal to about 40 vol. % to less than or equal to about 70 vol. %.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth, such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers, and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
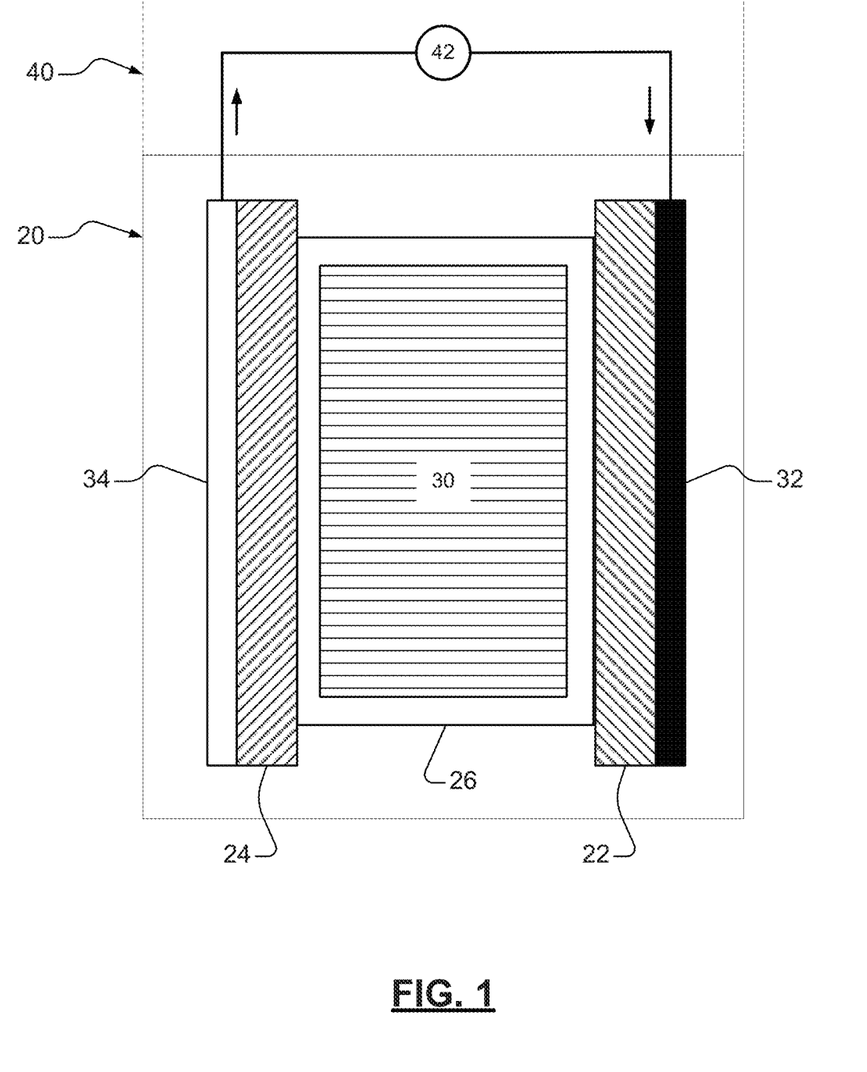
FIG. 1 is a schematic of an example electrochemical battery that cycles lithium ions.

Typical lithium-ion or lithium-sulfur batteries often include a first electrode (such as a positive electrode or cathode) opposing a second electrode (such as a negative electrode or anode) and a separator and/or electrolyte disposed therebetween. Often, in a battery pack, batteries or cells may be electrically connected in a stack or winding configuration to increase overall output. Lithium-ion and lithium-sulfur batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and, in various aspects, may be in liquid, gel, or solid form. For example, an exemplary and schematic illustration of an electrochemical cell (also referred to as the battery) 20 is shown in FIG. 1. Though the illustrated example includes a single positive electrode (e.g., cathode) 24 and a single negative electrode (e.g., anode) 22, the skilled artisan will recognize that the current teachings apply to various other configurations of electrochemical cells, including those having one or more positive electrodes and one or more negative electrodes, as well as various current collectors with electroactive layers disposed on or adjacent to one or more surfaces thereof.

The battery 20 includes a negative electrode 22, a positive electrode 24, and a separator 26 disposed between the electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24.

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive electrode current collector 34 may be a metal foil, metal grid or screen, or expanded metal, comprising aluminum or any other appropriate electrically conductive material known to those of skill in the art. The negative electrode current collector 32 may be a metal foil, metal grid or screen, or expanded metal, comprising copper or any other appropriate electrically conductive material known to those of skill in the art.

The battery 20 may generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions, which are also produced at the negative electrode 22, are concurrently transferred through the electrolyte 30 contained in the separator 26 towards the positive electrode 24. The electrons flow through the external circuit 40 and the lithium ions migrate across the separator 26 containing the electrolyte 30 to form intercalated lithium at the positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid through a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30, for example inside their pores, capable of conducting lithium ions between the negative electrode 22 and the positive electrode 24. Any appropriate electrolyte 30, whether in solid, liquid, or gel form, capable of conducting lithium ions between the electrodes 22, 24, may be used in the battery 20. For example, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (LiFAP) ($Li_3O_4P$), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the electrolyte may include greater than or equal to about 0.5 M to less than or equal to about 4.0 M of the one or more lithium salts. In certain variations, for example when the electrolyte has a lithium concentration greater than about 2 M or ionic liquids, the electrolyte may include one or more diluters, such as fluoroethylene carbonate (FEC) and/or hydrofluoroether (HFE).

The solid-state electrolyte may include one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure, and in certain aspects, the separator 26. In various aspects, the polymer-based particles may be intermingled with a lithium salt so as to act as a solid solvent.

In various aspects, the oxide-based particles may comprise one or more garnet ceramics, LISICON-type oxides, NASICON-type oxides, and Perovskite-type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The one or more LISICON-type oxides may be selected from the group consisting of: $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where $0 \le x \le 2$), $Li_{1+x}Al_xTi_{2-x}(PO_4)_3$ (LATP) (where $0 \le x \le 2$), $Li_{1+x}Y_xZr_{2-x}(PO_4)_3$ (LYZP) (where $0 \le x \le 2$), $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The one or more Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

In various aspects, the polymer-based particles may comprise one or more of polymer materials selected from the group consisting of: polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene (PVDF-HFP), polyvinyl chloride (PVC), and combinations thereof. The sulfide-based particles may include one or more sulfide-based materials selected from the group consisting of: $Li_2S$—$P_2S_5$, $Li_2S$—$P_2S_5$-$MS_x$ (where M is Si, Ge, and Sn and $0 \le x \le 2$), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_sS_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5-xLi_2S$ (where $0.5 \le x \le 0.7$), and combinations thereof. The halide-based particles may include one or more halide-based materials selected from the group consisting of: $Li_2CdCl_4$, $Li_2MgCl_4$, $Li_2CdI_4$, $Li_2ZnI_4$, $Li_3OCl$, LiI, $Li_5ZnI_4$, $Li_3OCl_{1-x}Brx$ (where $0<x<1$), and combinations thereof.

In various aspects, the borate-based particles may include one or more borate-based materials selected from the group consisting of: $Li_2B_4O_7$, $Li_2O$—$(B_2O_3)$—$(P_2O_5)$, and combinations thereof. The nitride-based particles may include one or more nitride-based materials selected from the group consisting of: $Li_3N$, $Li_7PN_4$, $LiSi_2N_3$, LiPON, and combinations thereof. The hydride-based particles may include one or more hydride-based materials selected from the group consisting of: $Li_3AlH_6$, $LiBH_4$, $LiBH_4$—LiX (where X is one of Cl, Br, and I), $LiNH_2$, $Li_2NH$, $LiBH_4$—$LiNH_2$, and combinations thereof. In still further variations, the electrolyte 30 may be a quasi-solid electrolyte comprising a hybrid of the above detailed non-aqueous liquid electrolyte solution and solid-state electrolyte systems—for example, including one or more ionic liquids and one or more metal oxide particles, such as aluminum oxide ($Al_2O_3$) and/or silicon dioxide ($SiO_2$).

In various aspects, the electrolyte 30, for example as a solid-state electrolyte, may serve as both a conductor of lithium ions and a separator, for example separator 26, such that a distinct separator component is not required. In various other aspects, however, the separator 26 may be a microporous polymeric separator including, for example a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC. Various other conventionally available polymers and commercial products for forming the separator 26 are contemplated, as well as the many manufacturing methods that may be employed to produce such a microporous polymer separator 26.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF—hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

In various aspects, the negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode. For example, the negative electrode 22 may include a plurality of electrolyte particles (not shown).

The negative electrode 22 may include a negative electroactive material that is lithium based comprising, for example, a lithium metal and/or lithium alloy. In other variations, the negative electrode 22 may include a negative electroactive material that is silicon based comprising silicon, for example, a silicon alloy, silicon oxide, or combinations thereof that may be further mixed, in certain instances, with graphite. In still other variations, the negative electrode 22 may be a negative electroactive material that is a carbonaceous anode comprising, for example, one or more negative electroactive materials such as graphite, graphene, and/or carbon nanotubes (CNTs). In still further variations, the negative electrode 22 may comprise one or more lithium-accepting negative electroactive materials, such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), and one or more metal sulfides (such as ferrous or iron sulfide (FeS)). In various aspects, as further detailed below, the negative electroactive material may be pre-lithiated.

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (Li-PAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN' black or DENKA' black), carbon fibers and nanotubes, graphene, and the like. Examples of a conductive polymer include polyaniline, polythiophene, polyacetylene, polypyrrole, and the like.

For example, the negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

In various aspects, the positive electrode 24 comprises a lithium-based positive electroactive material that is capable of undergoing lithium intercalation and deintercalation, alloying and dealloying, or plating and stripping, while functioning as a positive terminal of the capacitor battery 20. For example, the positive electrode 24 may include one or more sulfur-containing positive electroactive materials, for example one or more of S, $S_8$, $Li_2S_8$, $Li_2S_6$, $Li_2S_4$, $Li_2S_2$, and $Li_2S$.

The positive electrode 24 may be defined by a plurality of electroactive material particles (not shown in FIG. 1, but as will be described in further detail below in the context of FIG. 2). Such positive electroactive material particles may be disposed in one or more layers so as to define the three-dimensional structure of the positive electrode 24. For example, the positive electrode 24 may have a porosity greater than or equal to about 40 vol. % to less than or equal to about 70 vol. %, and in certain aspects, optionally greater than or equal to about 50 vol. % to less than or equal to about 60 vol. %. The electrolyte 30 may be introduced, for example after cell assembly, and contained within the pores (not shown). For example, the positive electrode 24 may include a plurality of electrolyte particles (not shown).

In various aspects, the positive electroactive material of the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN' black or DENKA' black), carbon fibers and nanotubes, graphene, and the like. Examples of a conductive polymer include polyaniline, polythiophene, polyacetylene, polypyrrole, and the like.

For example, the positive electrode 24 may include greater than or equal to about 45 wt. % to less than or equal to about 99 wt. %, and in certain aspects, optionally greater than or equal to about 45 wt. % to less than or equal to about 80 wt. %, of the positive electroactive material; greater than or equal to about 0 wt. % to less than or equal to about 45 wt. %, and in certain aspects, optionally greater than or equal to about 9 wt. % to less than or equal to about 45 wt. %, of one or more electrically conductive materials; and greater than or equal to about 0 wt. % to less than or equal to about 20 wt. %, and in certain aspects, optionally greater than or equal to about 2 wt. % to less than or equal to about 10 wt. %, of one or more binders.

In various aspects, the present disclosure provides a method for making a positive electrode (e.g., cathode), for example a sulfur-containing positive electrode 24 like that illustrated in FIG. 1. The method may include disposing an electroactive material on or near a current collector to form an electroactive material layer having a first porosity and applying pressure and heat to the electroactive material layer so that the electroactive material layer has a second porosity. The first porosity may be greater than the second porosity. The electroactive material may include a plurality of electroactive material particles and one or more salt additives. The method may further include contacting the electroactive material layer and an electrolyte such that the electrolyte dissolves the plurality of one or more salt particles so that the electroactive material layer has a third porosity. The third porosity may be greater than the second porosity and less than the first porosity.

Figure 2:
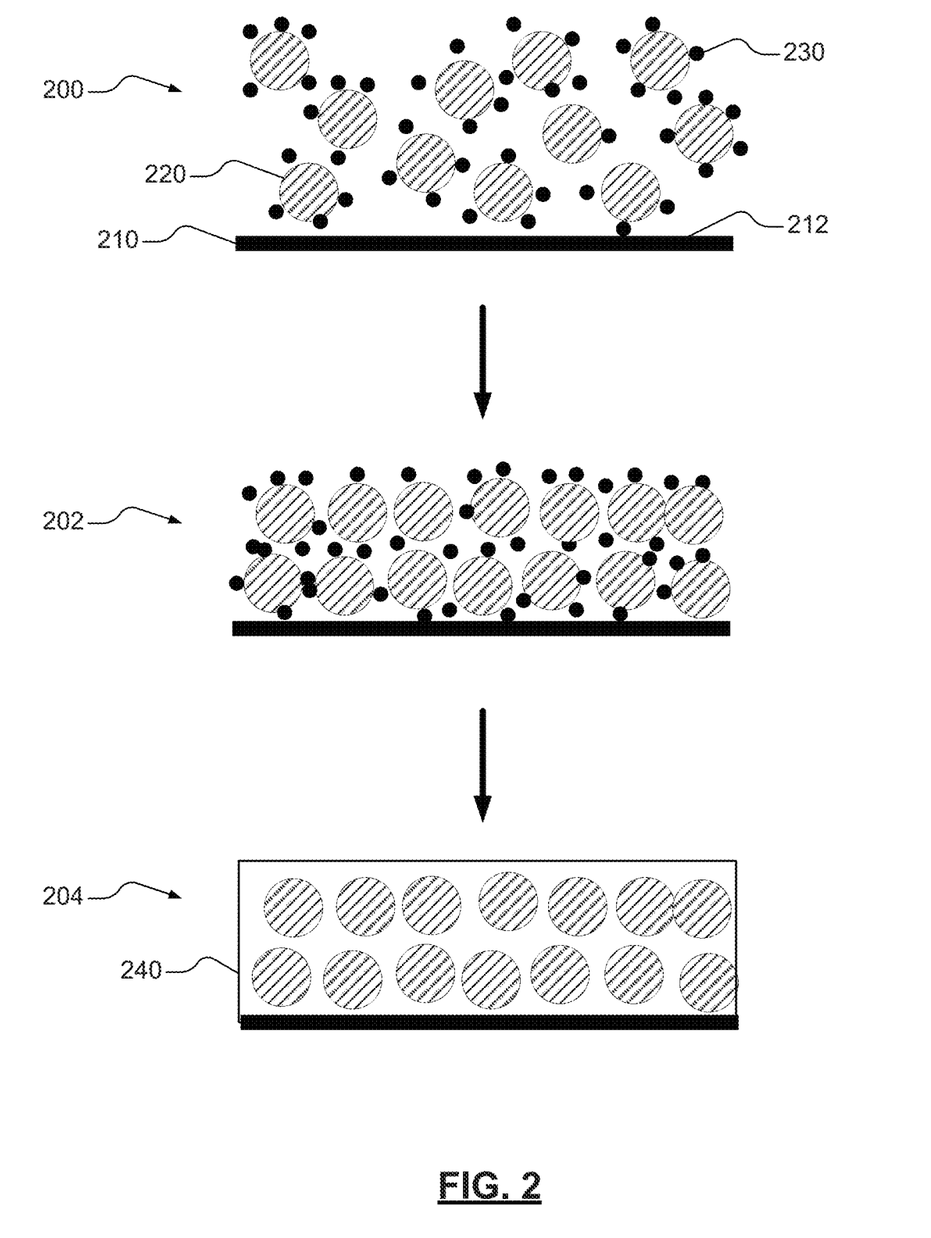
FIG. 2 is a schematic of an example method for forming a sulfur-containing electrode.

More specifically, as illustrated in FIG. 2, the method may include disposing an electroactive material admixture on or near one or more surfaces of a current collector 210 to form a first or initial electroactive material layer 200. For example, the electroactive material admixture may be disposed on or near a first surface 212 of the current collector 210. The initial electroactive material layer 200 may have a first porosity. For example, the first porosity may be greater than or equal to about 60 vol. % to less than or equal to about 80 vol. %, and in certain aspects, optionally greater than or equal to about 65 vol. % to less than or equal to about 75 vol. %, of the initial electroactive material layer 200.

The admixture of the electroactive material may be a slurry including, for example, a plurality of sulfur-based electroactive material particles 220 and a plurality of salt additive particles 230, and in certain aspects, further including a carrier or solvent. In various aspects, the slurry may optionally include the one or more electrically conductive materials and/or the at least one polymeric binder material. The various other components or elements of the admixture may be soluble or insoluble in the carrier or solvent. The initial electroactive material layer 200 may be formed by drying the slurry, for example, by volatilizing or evaporating the carrier or solvent.

The electroactive material admixture may include greater than or equal to about 50 wt. % to less than or equal to about 95 wt. %, and in certain aspects, optionally greater than or equal to about 70 wt. % to less than or equal to about 90 wt. %, of the sulfur-based of the electroactive material particles and greater than or equal to about 5 wt. % to less than or equal to about 50 wt. %, and in certain aspects, optionally greater than or equal to about 10 wt. % to less than or equal to about 30 wt. %, of the plurality of salt additive particles. An amount of the plurality of salt additive particles greater than about 50 wt. % may increase the dead weight of the formed electrode 280, while an amount of the plurality of salt additive particles less than about 5 wt. % may not provide a sufficient porosity, as further detailed below.

In various aspects, the plurality salt additive particles 230 may be disposed along the exposed surfaces of the sulfur-based electroactive material particles 220. The sulfur-based electroactive material particles 220 may include one or more positive electroactive materials selected from the group consisting of: S, $S_8$, $Li_2S_8$, $Li_2S_6$, $Li_2S_4$, $Li_2S_2$, $Li_2S$, and combinations thereof. The plurality of salt additive particles 230 may be selected from the group consisting of: lithium hexafluorophosphate ($LiPF_6$), lithium hexafluoroarsenate ($LiAsF_6$), lithium fluorosulfonylimide ($LiN(FSO_2)_2$) (LiFSI), lithium bis(trifluoromethanesulfonimide) ($LiN(CF_3SO_2)_2$), lithium triflate ($LiCF_3SO_3$), lithium perchlorate ($LiClO_4$), lithium tetrafluoroborate ($LiBF_4$), lithium nitrate ($LiNO_3$), lithium iodide (LiI), lithium bromide (LiBr), lithium bis(trifluoromethanesulfonimide) (LiTFSI) (LiN(CF$_3$SO$_2$)$_2$), and combinations thereof.

With renewed reference to FIG. 2, the method may further include applying a pressure for consolidation or densification to the initial electroactive material layer 200, for example calendaring the initial electroactive material layer 200 between a flat surface and a roller or between two rollers, to form an intermediate or second electroactive material layer 202 having a second porosity. The second porosity is lower than the first porosity. For example, the second porosity may be greater than or equal to about 30 vol. % to less than or equal to about 65 vol. %, and in certain aspects, optionally greater than or equal to about 40 vol. % to less than or equal to about 55 vol. %, of the intermediate electroactive material layer 202.

In various aspects, the pressure applied to the initial electroactive material layer 200 may be applied using a roll pressing method having a controlled gap. In various aspects, applying the pressure to the initial electroactive material layer 200 may further include applying heat to the initial electroactive material layer 200. For example, the initial electroactive material layer 200 may be heated to a temperature greater than or equal to about 40° C. to less than or equal to about 100° C., and in certain aspects, optionally greater than or equal to about 50° C. to less than or equal to about 80° C.

In various aspects, the method may further include contacting the intermediate electroactive material layer 202 with an electrolyte 240 such that the electrolyte 240 dissolves the plurality of salt additive particles 230 to form a final or third electroactive material layer 204 having a third porosity. The third porosity may be greater than the second porosity and less than the first porosity. For example, the third porosity may be greater than or equal to about 40 vol. % to less than or equal to about 70 vol. %, and in certain aspects, optionally greater than or equal to about 50 vol. % to less than or equal to about 60 vol. %, of the final electroactive material layer 204. The electrolyte 240, similar to electrolyte 30, may be a non-aqueous liquid electrolyte solution that includes a lithium salt dissolved in an organic solvent or a mixture of organic solvents. For example, the electrolyte 240 may include one or more lithium salts that dissolve in chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof.

The final electroactive material layer 204 and the current collector 210 may define a sulfur-containing positive electrode. As further illustrated in the following examples, providing the plurality of salt additive particles 230, which may be subsequently dissolved when an electrolyte 240 is introduced into or contacted with the second electroactive material layer 202, may improve the wettability of the electrode and thus sulfur utilization.

EXAMPLES

Embodiments and features of the present technology are further illustrated through the following non-limiting examples:

An example of a sulfur-containing electrode is prepared in accordance with various aspects of the present disclosure. For example, the electrode is prepared using a plurality of salt additive particles, such as lithium bis(trifluoromethanesulfonimide) (LiTFSI) (LiN(CF$_3$SO$_2$)$_2$, and a calendaring process, so as to form an electroactive material layer having a porosity greater than or equal to about 30 vol. % to less than or equal to about 65 vol. %. The electrode may include greater than or equal to about 10 wt. % of the plurality of salt additive particles. The sulfur-containing electrode may be incorporated within electrochemical cells, for example battery 20 illustrated in FIG. 1.

Figure 3A:
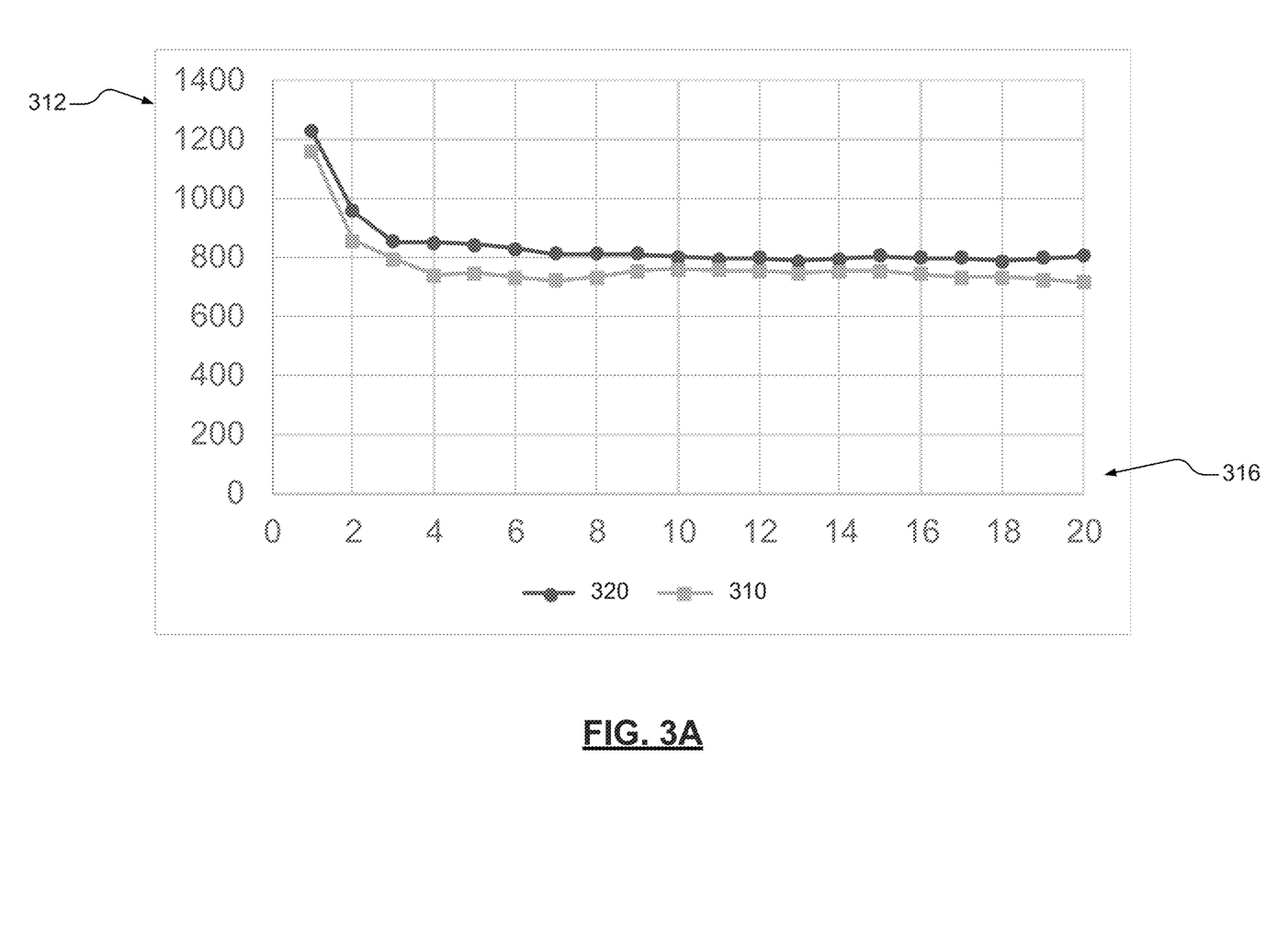
FIG. 3A is a graphical illustration of the capacity retention of electrochemical cells including sulfur-containing electrodes and prepared in accordance with various aspects of the present disclosure.
Figure 3B:
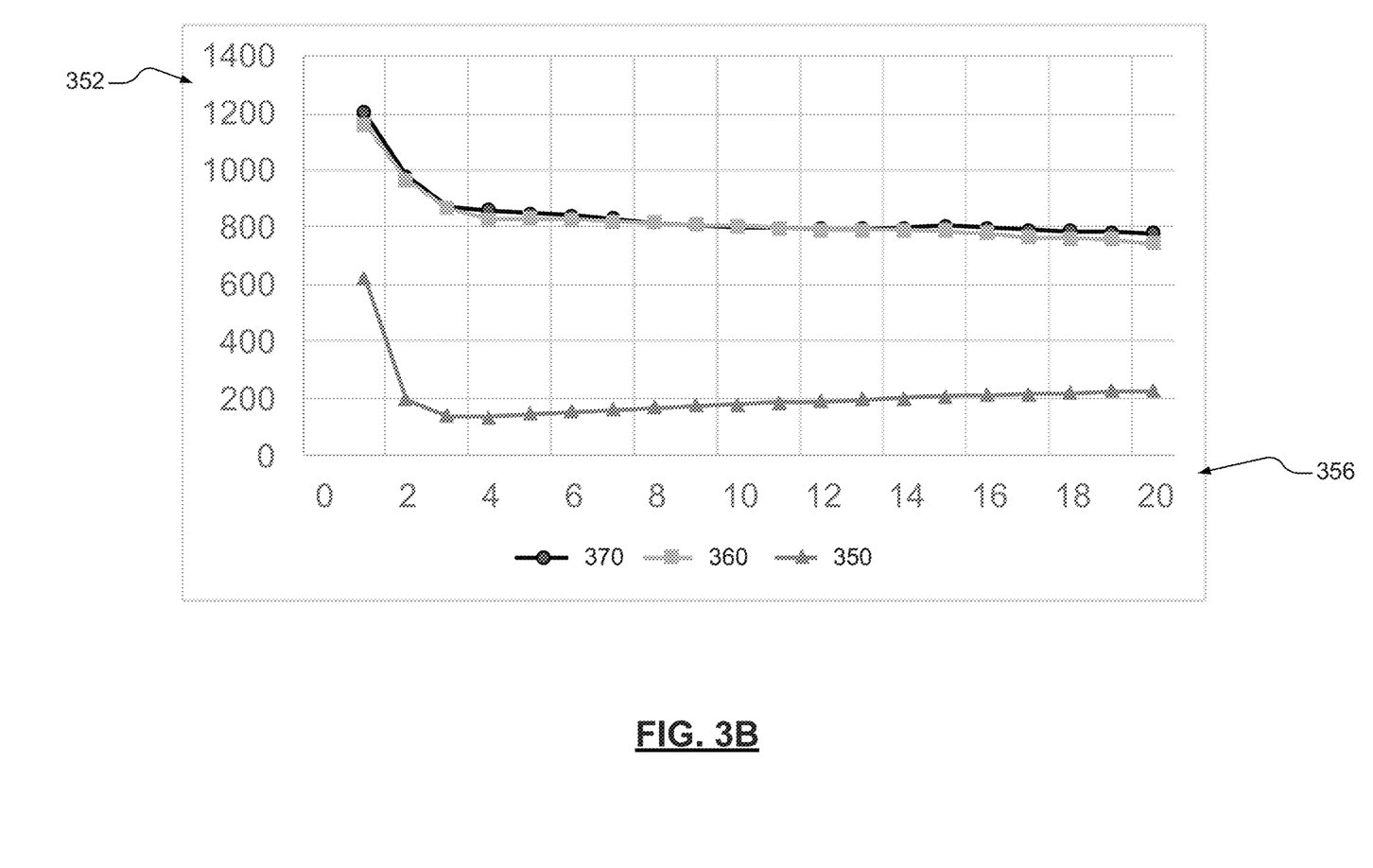
FIG. 3B is a graphical illustration of the capacity retention of comparative electrochemical cells.

As illustrated in FIG. 3A, the example electrochemical cells 310, 320 including the sulfur-containing electrode prepared in accordance with various aspects of the present disclosure have improved capacity retention and long-term performance, especially when compared to the comparative, baseline electrochemical cells 350, 360, 370 illustrated in FIG. 3B. The y-axis 312 in FIG. 3A represents specific capacity (mAh/g), while cycle number is shown on the x-axis 316. The y-axis 352 in FIG. 3B represents specific capacity (mAh/g), while cycle number is shown on the x-axis 356. For example, the example electrochemical cell 310 having a sulfur-containing electrode prepared in accordance with various aspects of the present disclosure and having a porosity of about 50 vol. % may have an about 300% improvement in capacity retention compared to the baseline electrochemical cells 350, 360, 370. Example electrochemical cell 320 having a sulfur-containing electrode prepared in accordance with various aspects of the present disclosure and having a porosity of about 65 vol. % may have an improvement in capacity retention greater than or equal to about 5% to less than or equal to about 10% when compared to the comparative, baseline electrochemical cells 350, 360, 370 illustrated in FIG. 3B. Baseline electrochemical cell 350 has a sulfur-containing electrode having a porosity of about 50%. Baseline electrochemical cell 360 has a sulfur-containing electrode having a porosity of about 60%. Baseline electrochemical cell 370 has a sulfur-containing electrode having a porosity of about 70%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing an electrode for use in an electrochemical cell that cycles lithium ions, wherein the method comprises:

disposing an electroactive material admixture on or near one or more surfaces of a current collector, wherein the electroactive material admixture is a slurry comprising a plurality of electroactive material particles, a plurality of salt additive particles, and a carrier;

drying the electroactive material admixture so as to remove the carrier and form an electroactive material layer having a first porosity;

applying pressure to the electroactive material layer so that the electroactive material layer has a second porosity, wherein the first porosity is greater than the second porosity; and contacting the electroactive material layer with an electrolyte such that the electrolyte dissolves the plurality of salt additive particles, so that the electroactive material layer has a third porosity that is greater than the second porosity and less than the first porosity, wherein the electroactive material layer and the current collector define the electrode.

2. The method of claim 1, wherein the plurality of salt additive particles are selected from the group consisting of: lithium hexafluorophosphate (LiPF$_6$), lithium hexafluoroarsenate (LiAsF$_6$), lithium fluorosulfonylimide (LiN(FSO$_2$)$_2$) (LiFSI), lithium bis(trifluoromethanesulfonimide) (LiN(CF$_3$SO$_2$)$_2$), lithium triflate (LiCF$_3$SO$_3$), lithium perchlorate (LiClO$_4$), lithium tetrafluoroborate (LiBF$_4$), lithium nitrate (LiNO$_3$), lithium iodide (LiI), lithium bromide (LiBr), lithium bis(trifluoromethanesulfonimide) (LiTFSI) (LiN(CF$_3$SO$_2$)$_2$), and combinations thereof.

3. The method of claim 1, wherein the electroactive material admixture comprises greater than or equal to about 70 wt. % to less than or equal to about 90 wt. % of the plurality of electroactive material particles based on a total weight of the electroactive material admixture and greater than or equal to about 10 wt. % to less than or equal to about 30 wt. % of the plurality of salt additive particles based on a total weight of the electroactive material admixture.

4. The method of claim 1, wherein the first porosity is greater than or equal to about 60 vol. % to less than or equal to about 80 vol. % of the electroactive material layer and the second porosity is greater than or equal to about 30 vol. % to less than or equal to about 65 vol. % of the electroactive material layer.

5. The method of claim 1, wherein the third porosity is greater than or equal to about 40 vol. % to less than or equal to about 70 vol. % of the electroactive material layer.

6. The method of claim 1, wherein the electrolyte comprises one or more lithium salts that dissolve in one or more solvents selected from 1,2-dimethoxyethane (DME), 12-diethoxyethane, ethoxymethoxyethane, tetrahydrofuran, 2-methyltetrahydrofuran, 1,3-dioxolane (DOL), and sulfolane.

7. The method of claim 1, wherein the applying pressure further includes applying heat to the electroactive material layer,
wherein the electroactive material layer is heated to greater than or equal to about 40° C. to less than or equal to about 100° C.

8. The method of claim 1, wherein each electroactive material particle of the plurality of electroactive material particles comprises one or more of S, S$_8$, Li$_2$S$_8$, Li$_2$S$_6$, Li$_2$S$_4$, Li$_2$S$_2$, and Li$_2$S.

9. A method of preparing a sulfur-containing electrode for use in an electrochemical cell that cycles lithium ions, wherein the method comprises:
disposing a slurry comprising a plurality of sulfur-based electroactive material particles a plurality of salt particles, and a carrier on or near one or more surfaces of a current collector;
drying the slurring so as to remove a carrier and form an electroactive material layer having a first porosity; and
calendaring the electroactive material layer, so that the electroactive material layer has a second porosity, wherein the first porosity is greater than the second porosity; and
contacting the electroactive material layer with an electrolyte such that the electrolyte dissolves the plurality of salt additive particles, so that the electroactive material layer has a third porosity that is greater than the second porosity and less than the first porosity, wherein the electroactive material layer and the current collector define the sulfur-containing electrode.

10. The method of claim 9, wherein the electroactive material layer comprises greater than or equal to about 70 wt. % to less than or equal to about 90 wt. % of the plurality of sulfur-based electroactive material particles based on a total weight of the electroactive material layer and greater than or equal to about 10 wt. % to less than or equal to about 30 wt. % of the plurality of salt particles based on a total weight of the electroactive material layer; and
wherein the plurality of salt particles are selected from the group consisting of: lithium hexafluorophosphate (LiPF$_6$), lithium hexafluoroarsenate (LiAsF$_6$), lithium fluorosulfonylimide (LiN(FSO$_2$)$_2$) (LiFSI), lithium bis(trifluoromethanesulfonimide) (LiN(CF$_3$SO$_2$)$_2$), lithium triflate (LiCF$_3$SO$_3$), lithium perchlorate (LiClO$_4$), lithium tetrafluoroborate (LiBF$_4$), lithium nitrate (LiNO$_3$), lithium iodide (LiI), lithium bromide (LiBr), lithium bis(trifluoromethanesulfonimide) (LiTFSI) (LiN(CF$_3$SO$_2$)$_2$), and combinations thereof.

11. The method of claim 9, wherein the first porosity is greater than or equal to about 60 vol. % to less than or equal to about 80 vol. % of the electroactive material layer and the second porosity is greater than or equal to about 30 vol. % to less than or equal to about 65 vol. % of the electroactive material layer.

12. The method of claim 9, wherein the third porosity is greater than or equal to about 40 vol. % to less than or equal to about 70 vol. % of the electroactive material layer.

13. The method of claim 9, wherein the electrolyte comprises one or more lithium salts that dissolve in one or more solvents selected from 1,2-dimethoxyethane (DME), 1-2-diethoxyethane, ethoxymethoxyethane, tetrahydrofuran, 2-methyltetrahydrofuran, 1,3-dioxolane (DOL), and sulfolane.

14. A method of preparing a sulfur-containing electrode configured to receive an electrolyte, wherein the method comprises:
disposing an electroactive material admixture on or near one or more surfaces of a current collector, wherein the electroactive material admixture comprises a plurality of electroactive material particles and a plurality of salt additive particles, and a carrier; and
drying the electroactive material admixture so as to form an electroactive material layer having a first porosity;
calendaring the electroactive material layer, so that the electroactive material layer has a second porosity, wherein the first porosity is greater than the second porosity and the electroactive material layer and the current collector define the sulfur-containing electrode configured to receive the electrolyte,
wherein, when the electrolyte is received, the electrolyte dissolves the plurality of salt particles so that the electroactive material layer has a third porosity, wherein the third porosity is greater than the second porosity and less than the first porosity.

15. The method of claim 14, wherein the first porosity is greater than or equal to about 60 vol. % to less than or equal to about 80 vol. % of the electroactive material layer;
the second porosity is greater than or equal to about 30 vol. % to less than or equal to about 65 vol. % of the electroactive material layer; and
the third porosity is greater than or equal to about 40 vol. % to less than or equal to about 70 vol. % of the electroactive material layer.

16. The method of claim 14, wherein the electroactive material admixture comprises greater than or equal to about 70 wt. % to less than or equal to about 90 wt. % of the plurality of electroactive material particles based on a total weight of the electroactive material admixture and greater than or equal to about 10 wt. % to less than or equal to about 30 wt. % of the plurality of salt additive particles based on a total weight of the electroactive material admixture.

17. The method of claim 14, wherein the plurality of salt particles are selected from the group consisting of: lithium hexafluorophosphate ($LiPF_6$), lithium hexafluoroarsenate ($LiAsF_6$), lithium fluorosulfonylimide ($LiN(FSO_2)_2$) (LiFSII), lithium bis(trifluoromethanesulfonimide) ($LiN(CF_3SO_2)_2$), lithium triflate ($LiCF_3SO_3$), lithium perchlorate ($LiClO_4$), lithium tetrafluoroborate ($LiBF_4$), lithium nitrate ($LiNO_3$), lithium iodide (LiI), lithium bromide (LiBr), lithium bis(trifluoromethanesulfonimide) (LiTFSI) ($LiN(CF_3SO_2)_2$), and combinations thereof; and the electrolyte comprises one or more lithium salts that dissolve in one or more solvents selected from 1,2-dimethoxyethane (DME), 1-2-diethoxyethane, ethoxymethoxyethane, tetrahydrofuran, 2-methyltetrahydrofuran, 1,3-dioxolane (DOL), and sulfolane.

\* \* \* \* \*